United States Patent [19]

Tomisawa et al.

[11] Patent Number: 5,051,391

[45] Date of Patent: Sep. 24, 1991

[54] CATALYST FILTER AND METHOD FOR MANUFACTURING A CATALYST FILTER FOR TREATING A COMBUSTION EXHAUST GAS

[75] Inventors: Shigechika Tomisawa; Yukio Iida; Yuji Kaihara; Joji Tonomura; Kazuo Uoya; Kimitoshi Ose; Hiroshi Ogawa; Norihiko Ono; Tatsuo Ishii; Mamoru Ushiogi, all of Yokohama, Japan

[73] Assignee: Mitsubishi Jukogyo Kabushiki Kaisha, Tokyo, Japan

[21] Appl. No.: 333,428

[22] Filed: Apr. 4, 1989

[30] Foreign Application Priority Data

| Apr. 8, 1988 | [JP] | Japan | 63-85186 |
| May 23, 1988 | [JP] | Japan | 63-123956 |
| Jun. 3, 1988 | [JP] | Japan | 63-135649 |
| Jul. 21, 1988 | [JP] | Japan | 63-180394 |

[51] Int. Cl.$^5$ .......................... B01J 21/06; B01J 23/22; B01J 23/30
[52] U.S. Cl. .................... 502/242; 502/309; 502/350; 502/527
[58] Field of Search ............... 502/242, 309, 350, 527

[56] References Cited

U.S. PATENT DOCUMENTS

| 3,189,563 | 6/1965 | Hauel | 502/527 X |
| 4,113,660 | 9/1978 | Abe et al. | 502/350 X |
| 4,891,348 | 1/1990 | Imanari et al. | 502/350 X |

FOREIGN PATENT DOCUMENTS 55-155745 12/1980 Japan ................... 502/527

Primary Examiner—W. J. Shine
Attorney, Agent, or Firm—Toren, McGeady & Associates

[57] ABSTRACT

Disclosed are a catalyst filter characterized in that catalyst particles which are made of titanium oxide and vanadium oxide or titanium oxide, vanadium oxide and tungsten oxide and whose diameters are between 0.01 and 1 μm are carried by a filter made by weaving monofilaments of a glass fiber and/or of a catalytic fiber; a method for manufacturing thereof; and a comprehensive method for treating a combustion exhaust gas characterized in that an alkaline powder or ammonia or its precursor is supplied to a flow of a combustion exhaust gas containing toxic substances such as dust, acidic gases and nitrogen oxides, and the flow of a combustion exhaust gas is let pass through a filter carrying a catalyst for denitrating the above combustion exhaust gas.

7 Claims, 3 Drawing Sheets

CATALYST FILTER AND METHOD FOR MANUFACTURING A CATALYST FILTER FOR TREATING A COMBUSTION EXHAUST GAS

FIELD OF THE INVENTION AND RELATED ART STATEMENT

The present invention relates to a catalyst filter which is used in an apparatus for treating an exhaust gas from incinerators for city waste, sewage sludge or industrial waste, or from boilers or diesel engines, and to a method for manufacturing such a catalyst filter. The present invention also relates to a method for treating and removing nitrogen oxides, dust, and acidic gases such as fluorine, hydrogen fluoride, chlorine, hydrogen chloride and sulfur oxides contained in the above exhaust gas all at once using a catalyst filter.

In order to remove dust in an exhaust gas, such an apparatus as an electric precipitator (EP), a cyclone, a Venturi scrubber and a bag filter has conventionally been used. Also, in order to remove nitrogen oxides in an exhaust gas, a selective catalytic method has been known using ammonia as a reducing agent, and a catalyst of a honeycomb or pellet shape has been used.

Usually, a combustion exhaust gas contains nitrogen oxides and dust, and both a dust collector and a denitration apparatus are necessary for removing these.

Furthermore, if acidic gases such as fluorine, hydrogen fluoride, chlorine, hydrogen chloride, sulfur oxides are present in an exhaust gas, they are usually removed with a wet or semi-wet or dry method. The wet method removes dust using a scrubber or the like. In the semi-wet method an absorbent in a slurry form comprising slaked lime and magnesium hydroxide is sprayed into an evaporation reaction tower for absorbing and removing acidic gases, and the product thus produced is collected together with combustion dust and discharged out of the system. Also, the dry method uses slaked lime, quick lime, calcium carbonate and the like as an absorbent to be sprayed into a furnace or a duct, or this method introduces an exhaust gas into a moving layer of such an absorbent in order to absorb and remove acidic gases. Thus, a separate apparatus has been necessary especially for acidic gases.

OBJECT AND SUMMARY OF THE INVENTION

It is an object of the present invention to provide a solution to the above disadvantages, a catalyst filter and a manufacturing method thereof which make it possible to do denitration, dust removal and the absorption and removal of acidic gases all with one apparatus. It is another object of the present invention to provide a comprehensive method for treating a combustion exhaust gas which is capable of removing dust, acidic gases such as hydrogen fluoride, hydrogen chloride and sulfur oxides, and nitrogen oxides using a single element for removal.

That is, the present invention relates to:

(1) A catalyst filter which is characterized in that catalyst particles which are made of titanium oxide together with vanadium oxide and, if necessary, with tungsten oxide and whose diameters are between 0.01 and 1 $\mu$m are carried by a filter made by weaving monofilaments of a glass fiber whose diameter is between 3 and 15 $\mu$m so that the filter would have a density of 400 to 1000 g/m$^2$;

(2) A method for manufacturing a catalyst filter which comprises the steps of carrying out a surface treatment to a filter which is made by weaving monofilaments of glass fiber whose diameter is between 3 and 15 $\mu$m so that the filter has a density of 400 to 1000 g/m$^2$ by using a tetrafluoroethylene resin and/or carbon and/or silicone as necessary, impregnating a catalyst preparation solution of titanium oxide and vanadium oxide and, if necessary, tungsten oxide into the filter thus prepared, and, after drying it, baking this filter;

(3) A method for manufacturing a catalyst filter which is characterized in that the above filter is woven into plain weave or twill weave or satin (satean) weave;

(4) A method for manufacturing a catalyst filter which is characterized in that, at the time of the surface treatment as described above, after titanium oxide is carried by mixing titanium oxide particles whose diameters are between 0.01 and 1 $\mu$m, vanadium oxide and/or tungsten oxide are carried;

(5) A method for manufacturing a catalyst filter which is characterized in that, at the time of the surface treatment as described above, after titanium oxide particles and tungsten oxide are carried by mixing tungsten oxide with titanium oxide particles whose diameters are between 0.01 and 1 $\mu$m, vanadium oxide is carried;

(6) A method for manufacturing a catalyst filter which is characterized in that a filter which is woven into plain weave or twill weave or satin (satean) weave using a union yarn of monofilaments of a glass fiber and an anatase-type titania fiber so that the filter has a density of 400 to 1000 g/m$^2$ is surface treated by using a tetrafluoroethylene resin to which carbon is added and by using silicone as necessary, and then vanadium oxide and tungsten oxide are carried by the filter thus prepared;

(7) A method for manufacturing a catalyst filter which is characterized in that a filter is woven into plain weave or twill weave or satin weave using a union yarn of monofilaments of a glass fiber and an anatase-type titania fiber so that the filter has a density of 400 to 1000 g/m$^2$ and is immersed in a surface treatment agent comprising not only a tetrafluoroethylene resin and carbon and, if necessary, silicone, but also starting compounds of vanadium oxide and/or tungsten oxide so that catalyst components are carried and a surface treatment is carried out at the same time.

(8) A comprehensive method for treating a combustion exhaust gas which is characterized in that an alkaline powder or ammonia or their precursor is added to a flow of a combustion exhaust gas containing toxic substances such as dust, acidic gases and nitrogen oxides, and the flow of the combustion exhaust gas is passed through a filter carrying a catalyst for denitrating the above combustion exhaust gas; and (9) A comprehensive method for treating a combustion exhaust gas which is characterized in that the filter in (8) above is one of the filters of (1)–(3) above or is manufactured by one of the methods of (4)–(7) above.

DETAILED DESCRIPTION OF PREFERRED EMBODIMENTS

Some examples of glass fiber monofilaments that may be used in the present invention are shown in the following table.

TABLE 1

|  | $SiO_2$ | $B_2O_3$ | $Al_2O_3$ | $Fe_2O_3$ | CaO | MgO | $Na_2O$ | Other | |
|---|---|---|---|---|---|---|---|---|---|
| Long fiber (A) | 53.49 | 9.86 | 14.69 | 0.18 | 16.49 | 4.58 | — | 0.78 | |
| Long fiber (B) | 57.71 | — | 14.55 | 0.38 | 11.43 | 6.06 | 0.22 | $TiO_2$ | 0.65 |
|  |  |  |  |  |  |  |  | BaO | 8.95 |
| Glass wool (C) | 57.42 | 5.22 | 3.75 | 0.27 | 15.82 | 6.23 | 10.55 | $TiO_2$ | 0.15 |
|  |  |  |  |  |  |  |  | BaO | 0.34 |
| Long fiber (D) | 66.90 | — | 1.99 |  | 13.71 | 1.29 | 16.21 |  | |

These types of monofilament glass fibers become easy to break as their diameter becomes large. Since some strength against breaking is required for a filter, the diameters of these monofilaments should be 15 μm or less, preferably 9 μm or less in the present invention. Also, if the diameters of monofilaments are small, although strength is improved against breaking, it becomes very difficult and expensive to manufacture. In the present invention, the lower limit of the diameter is therefore set at 3 μm.

Although a filter can be used which is woven into plane weave or twill weave or satin (satean) weave, twill weave is preferred.

The density of the woven filter is expressed by the weight (gram) of monofilament used per unit area (m²) of a glass fiber cloth. If the density is small, the mesh of a filter becomes coarse and finer dust would easily pass through it, with the result of lowering of the filtering capability. If the density is large, the mesh of a filter can easily be clogged and the filter itself becomes thicker, not only undermining the filter characteristics, but also causing the bridging phenomena of a catalyst attached to the filter with the result of powdering. For the above reasons, the density is chosen to be between 400 and 1000 g/m², preferably 600 to 900 g/m².

Figure 1:
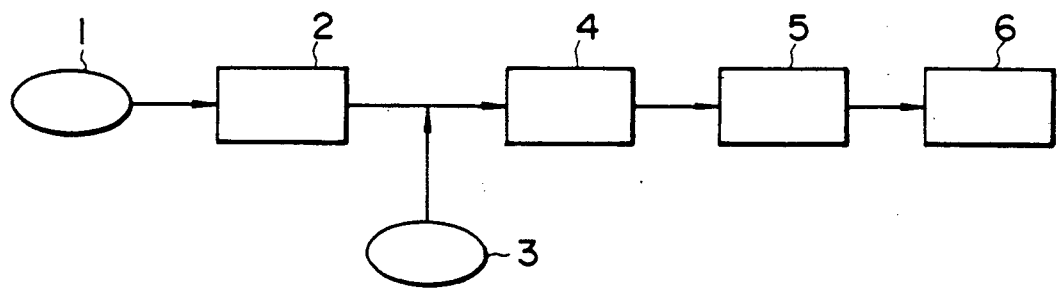
FIG. 1 shows a flow chart of a manufacturing process for a catalyst filter of the present invention.

As shown in FIG. 1, in a surface treatment step 2, a surface treatment using a fluoroethylene-type resin such as a tetrafluoroethylene resin (commercially known as Teflon) is preferably carried out to a filter 1 which is woven as described above in order to improve its resistance to acid, to chemicals, to abrasion and to breaking and in order to make it easy for catalyst particles to attach to the filter. For better attachment of catalyst particles the content of the tetrafluoroethylene resin should be 1 to 10 weight % of the filter, preferably 4 to 8 weight %.

Also, carbon and/or silicone can be added to the tetrafluoroethylene resin. The content of carbon can be 0 to 5 weight %, preferably 1 to 3 weight %. Furthermore, the carbon used here is mainly graphite (plumbago) and may also contain amorphous carbon. Silicone is not always necessary since it has the similar functions as carbon, but there can be 0 to 2 weight % of it.

Next, a catalyst 3 is carried by the filter. Titanium oxide and vanadium oxide are used as a catalyst. Tungsten oxide can also be used together with these. A method for carrying a catalyst starts with preparation of an oxalic acid solution containing anatase-type titanium oxide ($TiO_2$) whose particle diameters are between 0.01 to 1 μm and ammonium metavanadate ($NH_4VO_3$) and, if necessary, ammonium tungstate ($5(NH_4)_2O \cdot 12WO_3 \cdot 5H_2O$) and immersing the above filter in this solution at an immersion step 4. After excess solution is sufficiently removed from it, the filter is moved to a drying step 5 and dried at 100° to 150° C., preferably 110° to 130° C. The water content at this point is about 200 to 400 g/m². Subsequently, the filter is placed in a baking step 6 and is baked at 180° to 220° C., preferably 190° to 200° C., considering the heat resistance of the filter. The catalyst filter thus obtained contains, as active catalyst components, $TiO_2$, $V_2O_x$ (X=4-5) and $WO_x$ (X=2-3), and its composition by weight is preferred to be $TiO_2:V_2O_x:WO_x=90-95:1-10:0-5$. In particular, $V_2O_x$ should be 5 to 10 weight %. The amount attached should be 1 to 20 weight %, preferably 5 to 10 weight %.

Also, the catalyst particles attached to the filter should have particle diameters of 0.01 to 1 μm, preferably around 1 μm, considering attachment and permeability to the surface of the glass fiber, retentivity inside the fiber and restrictions imposed on the manufacture of a powder of titanium oxide.

Figure 2:
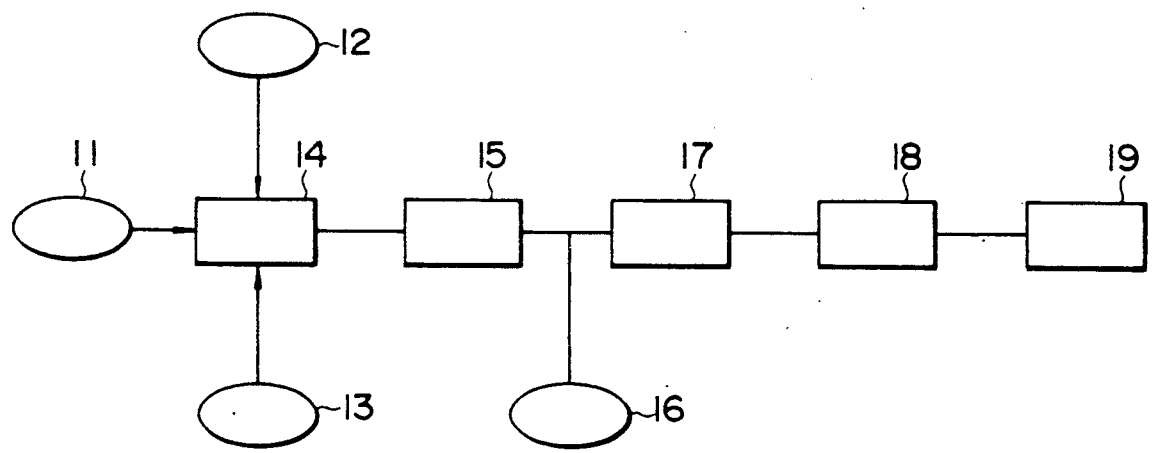
FIG. 2 shows a flow chart of another manufacturing process for a catalyst filter of the present invention.

A manufacturing process shown in FIG. 2 may also be employed.

A catalyst filter can also be manufactured as follows according to the present invention. A filter 11 which is formed by weaving glass fiber monofilaments is, at a step 14, immersed in a surface treatment solution 12 to which a powder of titanium oxide or a powder of titanium oxide and tungsten oxide 13 is added. Then the filter is cured in a surface treatment curing step 15. After the step 17 of immersing the filter in a solution 16 containing catalyst components such as ammonium metavanadate and ammonium tungstate, the filter is sent to a drying step 18 and then to a baking step 19 to manufacture a catalyst filter.

As a catalyst, titanium oxide together with vanadium oxide and/or tungsten oxide may be used. Titanium oxide can be carried either by adding an anatase-type titanium oxide ($TiO_2$) powder whose particle diameters are 0.01 to 1 μm to the above surface treatment solution so that titanium oxide may carried at the same time as the surface treatment or by adding tungsten oxide together with a powder of titanium oxide to the above surface treatment solution. The catalyst thus carried is attached and stabilized by curing at 180° to 250° C. after immersing the filter in the above surface treatment solution. The catalyst particles such as titanium oxide firmly attached, by the method described above, to the surface of glass fiber will not easily detach during use. Also, ammonium metavanadate ($NH_4VO_3$) and/or ammonium tungstate ($5(NH_4)_2O \cdot 12WO_3 \cdot 5H_2O$) is prepared as an oxalic acid solution, and the above filter is immersed in this prepared solution. After removing excess solution from it, the filter is placed in a drying step and dried at 100° to 150° C., preferably 110° to 130° C. The water content at this point is 200 to 400 g/m². Subsequently, the filter is placed in a baking step and is baked at 180° to 220° C., preferably 190° to 200° C., considering the heat resistance of the filter. The catalyst filter thus obtained contains, as active catalyst components, $TiO_2$, $V_2O_x$ ($X=4-5$) and $WO_x$ ($X=2-3$), and its composition by weight is preferred to be $TiO_2:V_2O_x:WO_x=90-95:0-10:0-10$. In particular, $V_2O_x$ should be 5 to 10 weight %, and $WO_x$ should be 1 to 5 weight %. The amount attached should be 1 to 20 weight %, preferably 5 to 10 weight %.

Also, the catalyst particles attached to the filter should have particle diameters of 0.01 to 1 μm, preferably around 1 μm, considering attachment and permeability to the surface of the glass fiber, retentivity inside the fiber and restrictions imposed on the manufacture of a powder of titanium oxide.

Furthermore, the catalyst filter of the present invention can be made of glass fiber monofilaments and anatase-type titania fiber monofilaments. These materials are woven to form a filter and treated with a surface treatment agent to which a fluoroethylene-type resin and carbon or silicone are added. This filter is then immersed in a prepared solution containing denitrating components such as ammonium metavanadate, ammonium tungstate and the like and dried and baked to manufacture a catalyst filter.

In another method, the above filter woven using the above union yarn can also be immersed in a prepared solution containing a surface treatment agent and starting compounds for denitration catalysts and dried and baked to manufacture a catalyst filter.

Monofilaments whose compositions are shown in Table 1 may be used as a glass fiber here. The diameters of the long fibers are preferred to be 3 to 13 μm. Also, a monofilament of an anatase-type titania fiber can, for example, be manufactured by the method described in Japanese Patent Publication No. 215815/1985, and short or long fibers whose diameters are 0.1 to 10 μm are preferred. The blending ratio of the titania fiber (the weight % of the titania fiber against the total weight of a woven cloth) is preferred to be 1 to 50 weight %.

Although such monofilaments are woven into plane weave or twill weave or satin weave to form a filter, twill is preferred.

The density of the woven filter is expressed as the weight (gram) of monofilament used per unit area (m²) of a glass fiber cloth. If the density is small, the mesh of a filter becomes coarse and finer dust would easily pass through it, with the result of lowering of the filtering capability. If the density is large, the mesh of a filter can easily be clogged and the filter itself becomes thicker, not only undermining the filter characteristics, but also causing the bridging phenomena of a catalyst attached to the filter with the result of powdering. For the above reasons, the density is chosen to be between 400 and 1000 g/m², preferably 600 to 900 g/m².

The filter which is woven as described above should be coated with a fluoroethylene-type resin and carbon in order to improve its resistance to acid, to chemicals, to abrasion and to breaking and in order to make it easy for catalyst particles to attach to the filter. For better attachment of catalyst particles the content of the fluoroethylene-type resin should be 1 to 10 weight % of the filter, preferably 4 to 8 weight %. The carbon used here is mainly graphite (plumbago), but may also contain amorphous carbon. The content of carbon is 0 to 5 weight %, preferably 1 to 3 weight %. Silicone can be added to the above resin. Silicone is not always necessary since it has the similar functions as carbon, but there can be 1 to 2 weight % of it.

Active components of the catalyst are vanadium oxide and/or tungsten oxide. The starting compounds of these active components may be ammonium metavanadate and ammonium tungstate as well as compounds similar to them.

The amount of these active catalytic components attached is 0.1 to 10 weight %, preferably 0.5 to 2 weight %, and the concentration of a prepared solution and the amount of water absorbed into the filter cloth can be adjusted as necessary. The active components of the catalyst are $V_2O_x$ ($X=4-5$) and $WO_x$ ($X=2-3$), and should be 0.1 to 10 weight % and 0.1 to 5 weight %, respectively, to make a total of 0.1 to 10 weight %.

A method for carrying a catalyst starts with preparation of an oxalic acid solution containing ammonium metavanadate ($NH_4VO_3$) and/or ammonium tungstate ($5(NH_4)_2O.12WO_3.5H_2O$) and immersing the above filter in this solution. After excess solution is sufficiently removed from it, the filter is transferred to a drying step and dried at 100° to 150° C., preferably 110° to 130° C. The water content of glass fiber at this point is 200 to 400 g/m². Subsequently, the filter is placed in a baking step and is baked at 180° to 220° C., preferably 190° to 200° C., considering the heat resistance of the filter.

In another method, the catalyst components can be carried using a prepared solution which is prepared by adding vanadium oxide and/or tungsten oxide to a surface treatment agent. The catalyst thus carried is attached and stabilized by curing at 180° to 250° C. after immersing the filter in the above prepared solution. The catalyst components firmly attached, by the method described above, to the surface of a glass fiber will not easily detach during use.

EMBODIMENT 1

We weaved a glass fiber monofilament (E) whose diameter is 6 μm (its composition: $SiO_2$, 52-56%; $Al_2O_3$, 12-16%; CaO, 15-25%; MgO, 0-6%; $B_2O_3$, 8-13%; $Na_2O+K_2O$, 0-1%) into twill weave to a density of 850 g/m² to obtain a filter. We immersed this filter in a treatment solution containing 4-8 weight % of a tetrafluoroethylene resin, 1-5 weight % of carbon and 1-3 weight % of silicone, and dried the filter after the treatment solution was removed using a squeezing roller. Also, we prepared a prepared catalyst solution containing 6.5 g of anatase-type titanium oxide whose average particle diameter is 0.1 μm, 1.5 g of ammonium metavanadate and 160 cm³ of a 5% oxalic acid solution. We immersed the above filter in this prepared solution and dried it at 110° to 130° C. Then we baked the filter at 190° to 200° C. to obtain a catalyst filter. To this filter, 3 weight % of $TiO_2$ and $V_2O_5$, in the weight ratio of 90 to 10, respectively, were found to attach. Also, the average particle diameter of the catalyst was 0.1 μm.

We placed this catalyst filter in a tube of 38 mm diameter so that it makes the right angle to the tube and we have a filtering area of 11.3 cm².

Next, to this tube, we led an exhaust gas containing 100 ppm of $NO_x$, 80 ppm of $NH_3$ ($NH_3/NO_x=0.8$), 50 ppm of $SO_2$, 200 ppm of HCl, 20% of $H_2O$ and 10 g/Nm³ of dust and tested for denitration. The percentage of denitration (% $NO_x$ removed) was more than 78%, and more than 99.9% of dust was removed.

Also, we introduced an exhaust gas containing 700 ppm of hydrochloric acid into the above tube and tested for removal of hydrochloric acid by spraying 4 g/Nm³ (dry) of slaked lime particles at the front stage of the catalyst filter. The concentration of hydrochloric acid was found to be reduced to 25 ppm or less.

EMBODIMENT 2

We made a filter by weaving a glass fiber monofilament (E) whose diameter is 6 μm (its composition: $SiO_2$, 52-56%; $Al_2O_3$, 12-16%; CaO, 15-25%; MgO, 0-6%; $B_2O_3$, 8-13%; $Na_2O+K_2O$, 0-1%) into twill weave to a density of 850 g/m². We mixed 7 weight % of anatase-type titanium oxide whose average particle diameter is 0.1 μm into a treatment solution containing 4-8 weight % of a fluoroethylene-type resin, 1-5 weight % of carbon and 1-3 weight % of silicone. We then immersed the above filter in this solution and dried it after the treatment solution was removed from the filter using a squeezing roller. Also, we prepared a prepared catalyst solution by adding 1.0 g of ammonium metavanadate to 100 cm³ of a 5% oxalic acid solution. We immersed the above filter in this prepared solution and dried it at 110° to 130° C. Then we baked the filter at 190° to 200° C. to obtain a catalyst filter. To this filter, 3 weight % of $TiO_2$ and $V_2O_5$, in the weight ratio of 90/10 for $TiO_2/V_2O_5$, were found to attach. Also, the average particle diameter of the catalyst was 0.1 μm.

Figure 3:
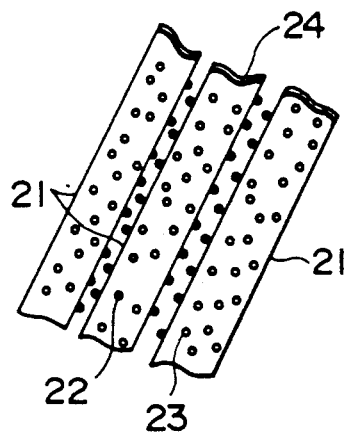
FIGS. 3 and 4 show how a catalyst component is attached to a surface of a bag filter of the present invention.

FIG. 3 shows how catalyst particles attach to the surface of the catalyst filter. Titanium oxide particles 22 and carbon particles 23 are seen to disperse on the surface of glass fiber monofilaments 21, and the glass fiber surface is covered by a layer 24 of a tetrafluoroethylene resin.

Next, to this tube, we led an exhaust gas containing 100 ppm of $NO_x$, 80 ppm of $NH_3$ ($NH_3/NO_x=0.8$), 50 ppm of $SO_2$, 200 ppm of HCl, 20% of $H_2O$ and 10 g/Nm³ of dust at a temperature of 230° C. and at a rate of 1 liter/min and tested for denitration. The percentage of denitration (% $NO_x$ removed) was more than 78%, and more than 99.9% of dust was removed.

Also, we introduced an exhaust gas containing 700 ppm of hydrochloric acid into the above tube and tested for removal of hydrochloric acid by spraying 4 g/Nm³ (dry) of slaked lime particles at the front stage of the catalyst filter. The concentration of hydrochloric acid was found to be reduced to 25 ppm or less.

EMBODIMENT 3

We made a filter by weaving a glass fiber monofilament (E) whose diameter is 6 μm (its composition: $SiO_2$, 52-56%; $Al_2O_3$, 12-16%; CaO, 15-25%; MgO, 0-6%; $B_2O_3$, 8-13%; $Na_2O+K_2O$, 0-1%) and anatase-type titania fiber monofilament whose diameter is 5 μm and whose blending ratio is 20 weight % into twill weave to a density of 850 g/m². We immersed the above filter in a surface treatment solution containing 8 weight % of a fluoroethylene-type resin and 2 weight % of carbon and dried it after the treatment solution was removed from the filter using a squeezing roller. Also, we prepared a prepared catalyst solution by adding 2.0 g of ammonium metavanadate to 100 cm³ of a 5% oxalic acid solution. We immersed the above filter in this prepared solution and dried it at 110° to 130° C. Then we baked the filter at 190° to 200° C. to obtain a catalyst filter. To this filter, 1 weight % of $V_2O_5$ was found to attach.

Figure 4:
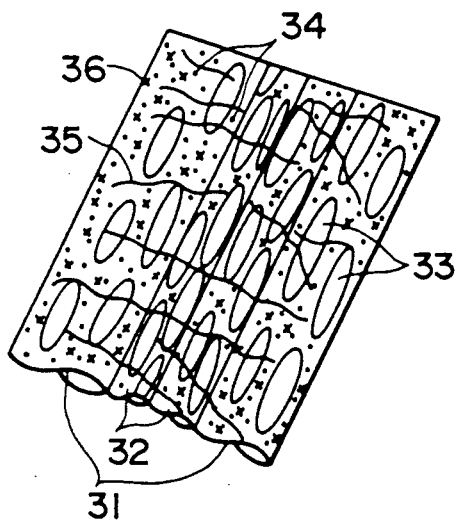

FIG. 4 shows how catalyst particles attach to the surface of the catalyst filter. The denitration active catalytic component of $V_2O_5$ 33 and carbon particles 34 are seen to disperse on the surfaces of glass fiber monofilament 31 and anatase-type titania fiber monofilament 32, and the monofilament surfaces are covered by strings 35 of a fluoroethylene-type resin and by a layer 36 of a fluoroethylene-type resin.

We placed this catalyst filter in a tube of 38 mm diameter so that it would make the right angle to the tube and we could have a filtering area of 11.3 cm².

Next, to this tube, we led an exhaust gas containing 100 ppm of $NO_x$, 80 ppm of $NH_3$ ($NH_3/NO_x=0.8$), 50 ppm of $SO_2$, 200 ppm of HCl, 20% of $H_2O$ and 10 g/Nm³ of dust at a temperature of 230° C. and at a rate of 1 liter/min and tested for denitration. The percentage of denitration (% $NO_x$ removed) was more than 78%, and more than 99.9% of dust was removed.

Also, we introduced an exhaust gas containing 700 ppm of hydrochloric acid into the above tube and tested for removal of hydrochloric acid by spraying 4 g/Nm³ (dry) of slaked lime particles at the initial stage of the catalyst filter. The concentration of hydrochloric acid was found to be reduced to 25 ppm or less.

The present invention relates also to a comprehensive method for treating a combustion exhaust gas which is characterized in that an alkaline powder, ammonia or their precursors are added to a flow of the combustion exhaust gas containing harmful components such as acidic gases and nitrogen oxides, and the combustion exhaust gas is passed through a filter supporting a denitration catalyst.

The filter supporting a denitration catalyst of the present invention may be as follows:

(a) A filter made of a cloth impregnated with a fine particle emulsion of a denitration catalyst (and a third material);

(b) A filter made of a cloth woven using a denitration catalyst fiber and another fiber such as a glass fiber and a metal fiber;

(c) A filter made of a cloth woven using a glass fiber carrying a denitration catalyst, a metal fiber and other kinds of fibers;

(d) A filter made of bag-like pieces of filter cloth containing denitration catalysts; and (e) A filter to which bag-like containers containing denitration catalysts are sewn.

Although a vanadium pentaoxide type or titanium oxide type catalyst is preferred here as a denitration catalyst, other kinds of catalysts can also be used. The average diameter of catalyst particles should be between 0.01 and 100 μm, and 1 m² of a filter cloth should carry 1 to 300 g of a catalyst so that the contact area between the catalyst and gas would be 0.1 to 10,000 m² per 1 m² of the filter cloth.

As an alkaline powder, materials such as $Ca(OH)_2$, $CaCO_3$, CaO, $Mg(OH)_2$, $MgCO_3$ and MgO may be used, and its particle diameter should be less than 100 μm, preferably 50 μm or less. The amount of such powder supplied should be 0.1 to 10 times the reaction equivalent of hydrochloric acid and sulfur oxides treated. Although an assistant powder can be precoated on the filter to protect it and to form an accumulation layer so that gas permeability and detachability are secured, such an assistant powder is not always necessary depending on the shape of a filter and the characteristics of a gas being treated and treatment conditions. As an assistant powder, zeolite, alumina, diatom (diatomaceous) earth, barite (barium sulfate), activated clay, kaolin, feldspar, quartz or the like, preferably a powder of diatom earth or barite or zeolite, should be used by itself or in the form of a mixture of two or more of these.

Particle diameters should be 1 to 100 μm, preferably 10 to 50 μm, and the amount of the assistant powder supplied should be 5 to 50% by weight of the amount of the alkaline powder.

As a reducing agent for nitrogen oxides, ammonia or its precursor such as urea can be used, and the amount of such a reducing agent supplied should be 0.1 to 1.5 times the reaction equivalent of nitrogen oxides.

Figure 5:
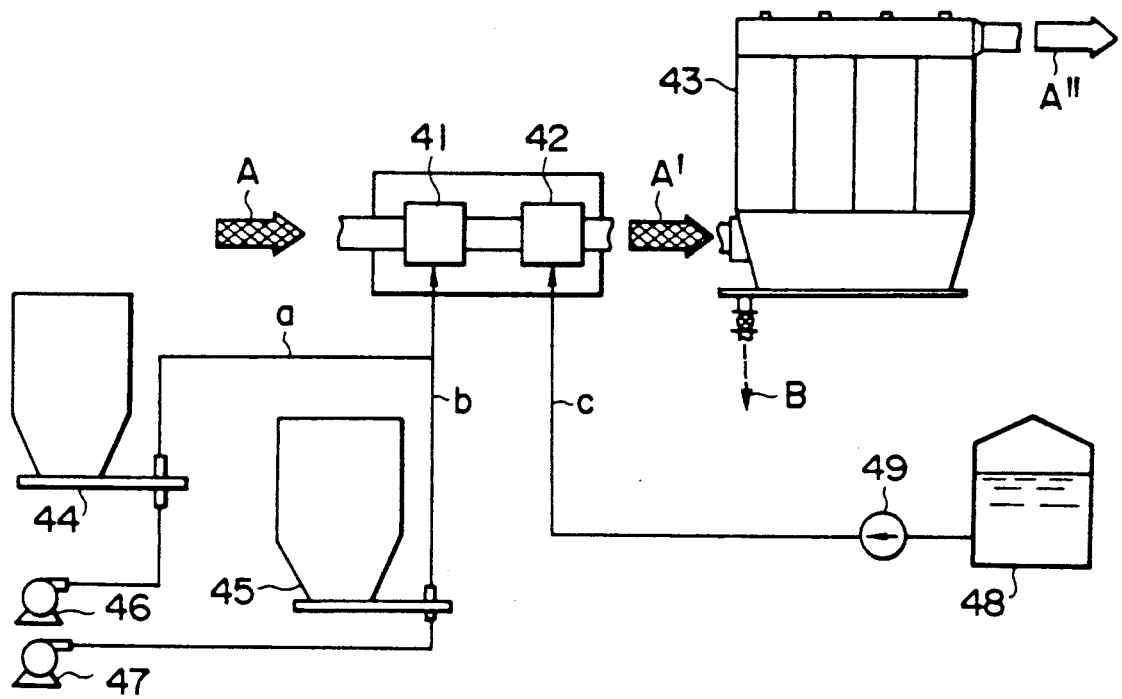
FIG. 5 shows a schematic view of an apparatus for embodying the comprehensive method for treating a combustion exhaust gas of the present invention.

FIG. 5 shows a schematic view of an apparatus which embodies a comprehensive method of the present invention for treating a combustion exhaust gas.

A combustion exhaust gas A is introduced to a supply apparatus for spraying a powder 41. A necessary amount of an alkaline powder a supplied from another supply apparatus 44 for spraying powder by a blower 46 and a necessary amount of an assistant powder b for better filtering supplied from yet another supply apparatus 45 for spraying powder by another blower 47 are supplied and sprayed into the above exhaust gas A in the supply apparatus 41. Hydrogen fluoride, hydrogen chloride and a part of sulfur oxides are removed through neutralization reactions.

Next, the above exhaust gas is led to a supply apparatus 42 for spraying liquid, and a necessary amount of a reducing agent c for nitrogen oxides which is supplied from a tank 48 by a pump 49 is sprayed into this exhaust gas. The exhaust gas A' containing an alkaline powder a, an assistant powder b and a reducing agent c is led into a comprehensive reaction dust collector of a filter type.

Figure 6:
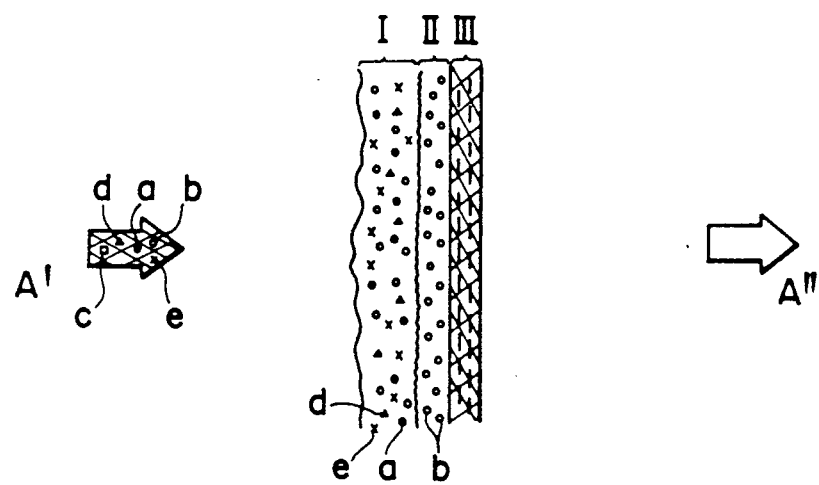
FIGS. 6, 7 and 8 are schematic diagrams of three embodiments illustrating the removal mechanisms in a reactor dust collector.

FIG. 6 shows a schematic diagram showing the removal mechanisms in the reaction dust collector 43. By precoating with the assistant powder b, a protective layer II is formed on the surface of the cloth filter III carrying a denitration catalyst II. By leading the above exhaust gas A' to this cloth filter an accumulation layer I is formed as the alkaline powder a, the assistant powder b, products of neutralization reactions d and flying ashes e are caught on the above protective layer II. Passing through this accumulation layer I, hydrogen fluoride, hydrogen chloride and sulfur oxides remaining in the exhaust gas are absorbed removed by reacting with the alkaline powder in this layer. Dust is also removed at the same time due to the filtering effect of the accumulation layer I.

The exhaust gas, having thus passed through the accumulation layer I and the protective layer II, is led to the denitration catalyst filter III together with the reducing agent c. Nitrogen oxides in the exhaust gas are reduced to nitrogen gas, and the exhaust gas will be released as a perfectly cleaned gas A".

Although the accumulation layer on the cloth filter III in the comprehensive reaction dust collector 43 maintains its gas permeability because of the assistant powder dispersed in the layer, its thickness increases gradually and the following measures have to be taken to prevent it from becoming too thick. Back (reverse) pressures, back washes, vibrations or the like need to be applied to shake off the accumulation layer I and to be discharged from the bottom portion of the dust collector as powder dust B.

Furthermore, as for the assistant powder b, after the protective layer II has been formed on the filter surface by supplying the assistant powder as described above, the alkaline powder a and the assistant powder b can be supplied and sprayed at the same time, or they may also be mixed together from the beginning and supplied at once. In addition, the protective layer II is not always necessary in the present invention and may be omitted if unnecessary.

Figure 7:
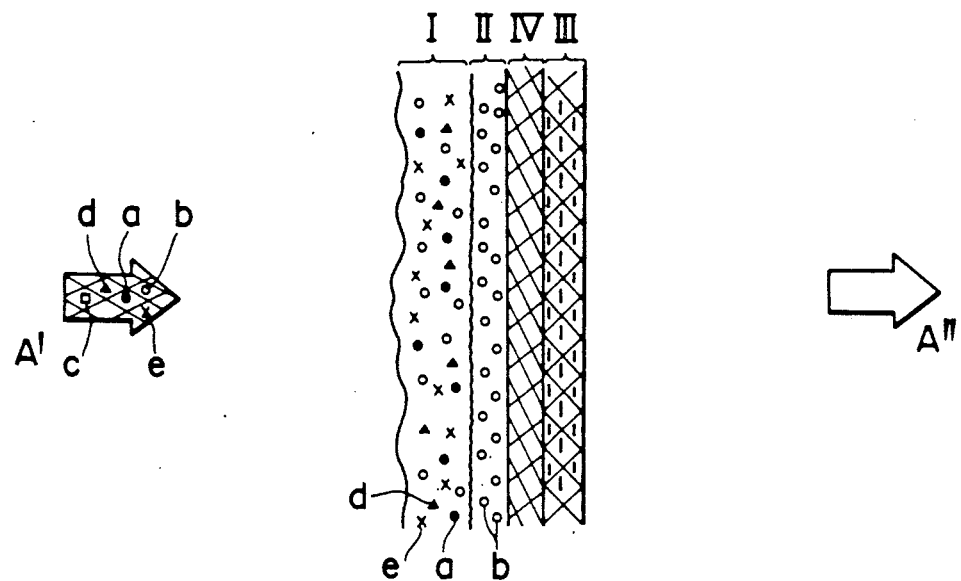

FIG. 7 is to explain the removal mechanisms when an exhaust gas is treated using a variation of the filter of FIG. 6. This filter is formed by placing an ordinary filter cloth IV on the surface of filter cloth III carrying a denitration catalyst in FIG. 6 so that the ordinary filter cloth IV becomes on the upstream side of the gas flow and the filter cloth carrying denitration catalyst III is on the downstream side. This filter forms an accumulation layer I on the surface of the ordinary filter cloth IV by catching flying ashes, reaction products, the alkaline powder and the like and will protect the filter cloth III carrying the denitration catalyst. Although FIG. 7 shows a protective layer III of the assistant powder b precoated on the surface of the filter cloth IV, this protective layer is not always necessary if the above ordinary filter cloth IV is used.

Figure 8:
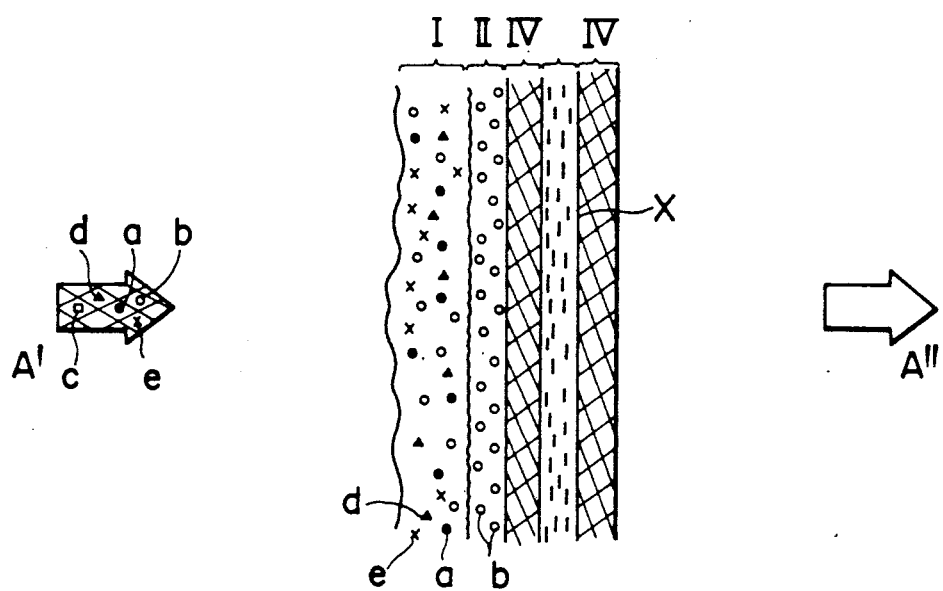

FIG. 8 is to explain the removal mechanisms when an exhaust gas is treated using another variation of the filter of FIG. 6. This filter is formed by sandwiching a denitration catalyst X with two pieces of filter cloth IV. Seams are placed to form a bag of a suitable size in which the catalyst is contained. Compared to the filter of FIG. 6, whose filter cloth directly carries the denitration catalyst powder, the filter of FIG. 8 has advantages of being able to maintain the flexibility, gas permeability and the like without losing any of original characteristics.

EMBODIMENT 4

We carried out an experiment of treating a combustion exhaust gas using the apparatus of FIG. 5.

First, we weaved a filter using a fiber whose diameter is 6 μm into double twill so that its density is 850 g/m$^2$. We also prepared an emulsion of a fine particle denitration catalyst of a vanadium pentaoxide and titanium oxide type. We immersed the above filter into this emulsion and obtained a filter carrying 3 weight % of catalyst components. We placed this filter in the reaction dust collector of FIG. 5.

We used an exhaust gas from an incinerator whose capacity is 150 ton/day and led the gas to the spray supply apparatus at a rate of 30,000 Nm$^3$/hr.

This exhaust gas was found to contain 5 g/Nm$^3$ of flying ashes, 50 ppm of HF, 1000 ppm of HCl, 100 ppm of SOx and 150 ppm of NOx.

Next, we supplied a slaked lime powder as an alkaline powder to the above exhaust gas at a rate of 100 kg/hr using a spray supply apparatus 41, and we blew a mixture of diatom earth and barite in a weight ratio of 9 to 1 as an assistant powder at a rate of 5 to 20 kg/hr, and further we blew ammonia gas in as a reducing agent at a rate of 4 m$^3$/hr. The time for the exhaust gas to pass the spray supply apparatus was 1 to 5 sec. Subsequently, we introduced the exhaust gas into a reaction dust collector 43 to carry out a comprehensive treatment.

We analyzed the exhaust gas at an outlet of the reaction dust collector and found 0.003 g/Nm$^3$ or less of dust, 5 ppm or less of HF, 20 ppm or less of HCl, 10 ppm or less of SO$_x$ and 20 ppm of NO$_x$.

Also, this denitration catalyst filter suffered little detachment and degradation despite a long period of time during which the gas passed and despite repeated back washes.

Furthermore, we weaved an ordinary filter cloth into twill using fiber whose diameter is 6 μm to have a weave density of 450 g/m$^2$. We set this filter cloth on the surface of the above denitration catalyst filter and carried out another treatment experiment of a combustion exhaust gas using a reaction dust collector in which this filter cloth and the catalyst filter were placed under the same conditions as in the above experiment.

We analyzed the exhaust gas at an outlet of the reaction dust collector to find very high treatment effects as in the above experiment. Furthermore, we found little detachment of the catalyst from the filter and little degradation of the catalyst and no loss of flexibility of the filter cloth.

The present invention shows the following advantages:

(1) Employing the above constructions, denitration catalysts can be attached to a filter which is superior in its resistance to acidity, folding, chemicals and abrasion. A resulting catalyst filter can denitrate an exhaust gas and remove dust from it at the same time, and, if an alkaline absorbent is used together, the filter also can remove acidic gases effectively.

(2) Employing the above constructions, a titania fiber which is an active denitration catalyst may be woven into a filter which is superior in its resistance to acidity, folding, chemicals and abrasion, and active catalysts attached to the titania fiber have particularly strong denitration capabilities. A resulting catalyst filter can denitrate an exhaust gas and remove dust from it at the same time, and, if an alkaline absorbent is used together, the filter also can remove acidic gases effectively.

(3) Employing the above constructions, a reaction dust collector having a denitration catalyst filter can remove dust, hydrogen fluoride, hydrogen chloride, sulfur oxides and nitrogen oxides virtually simultaneously. As a result, compared to conventional methods in which an independent treatment apparatus is needed for each treatment step, a single complete and multifunctional apparatus can carry out an entire treatment process, reducing required space, energy consumption, pressure losses and equipment costs. Also, denitration catalysts used here come into contact with a relatively clean gas from which dust, hydrogen fluoride, hydrogen chloride and sulfur oxides have already been removed, and therefore the catalysts' life may be extended with advantage.

We claim:

1. A catalyst filter which is characterized in that catalyst particles which are made of titanium oxide and vanadium oxide or titanium oxide, vanadium oxide and tungsten oxide and whose diameters are between 0.01 and 1 $\mu$m are carried by a filter made by weaving monofilaments of a glass fiber whose diameters are between 3 and 15 $\mu$m so that the filter has a density of 400 to 1000 g/m$^2$.

2. The catalyst filter as defined in claim (1) wherein the weight ratio of composition of the catalyst components is TiO$_2$:V$_2$O$_x$:WO$_x$=90-95:1-10:0-5, and the amount of the catalyst attached to the filter is 1 to 20 weight %.

3. A method for manufacturing a catalyst filter which is characterized by:

providing a filter which is made by weaving monofilaments of a glass fiber whose diameter is between 3 and 15 $\mu$m to have a density of 400 to 1000 g/m$^2$ with a surface treatment using a tetrafluoroethylene resin and carbon or a tetrafluoroethylene resin, carbon and silicone;

impregnating a catalyst preparation solution of titanium oxide and vanadium oxide or titanium oxide, vanadium oxide and tungsten oxide into the filter thus prepared; and after drying it, baking this filter.

4. A method for manufacturing a catalyst filter which is characterized by:

mixing a powder of titanium oxide whose particle diameters are 0.01 to 1 $\mu$m when providing a filter which is made by weaving monofilaments of a glass fiber whose diameter is between 3 and 15 $\mu$m to have a density of 400 to 1000 g/m$^2$ with a surface treatment using a tetrafluoroethylene resin and carbon or a tetrafluoroethylene resin, carbon and silicone if necessary, also using carbon and/or silicone, so that titanium oxide is carried; and adding subsequently vanadium oxide or vanadium oxide and tungsten oxide to the catalyst filter.

5. A method for manufacturing a catalyst filter which is characterized by:

mixing a powder of tungsten oxide and a powder of titanium oxide whose particle diameters are 0.01 to 1 $\mu$m when providing a filter which is made by weaving monofilaments of a glass fiber whose diameter is between 3 and 15 $\mu$m to have a density of 400 to 1000 g/m$^2$ with a surface treatment using a tetrafluoroethylene resin and carbon or a tetrafluoroethylene resin, carbon and silicone if necessary, also using carbon and/or silicone, so that titanium oxide and tungsten oxide are carried; and adding subsequently vanadium oxide to the catalyst filter.

6. A method for manufacturing a catalyst filter which is characterized by providing a filter which is made by weaving a union yarn of monofilaments of a glass fiber and of an anatase titania fiber to have a density of 400 to 1000 g/m$^2$ with a surface treatment using a tetrafluoroethylene resin and carbon or a tetrafluoroethylene resin, carbon and silicone if necessary, also using carbon and/or silicone and by adding vanadium oxide or vanadium oxide and tungsten oxide to the filter.

7. A method for manufacturing a catalyst filter which is characterized by simultaneously carrying out, to a filter which is made by weaving a union yarn of monofilaments of a glass fiber and of an anatase titania fiber to have a density of 400 to 1000 g/m$^2$, a surface treatment and carrying of catalysts by immersing the filter in a prepared solution containing a tetrafluoroethylene resin and carbon or a tetrafluoroethylene resin, carbon and silicone and adding vanadium oxide or vanadium oxide and tungsten oxide.

* * * * *